United States Patent
Davis

[15] 3,698,109
[45] Oct. 17, 1972

[54] COVER PLATE ATTACHMENT FOR ELEVATING SCRAPER

[72] Inventor: Charles Davis, Farmingdale, N.Y.
[73] Assignee: Davis Construction Corporation, Hicksville, N.Y.
[22] Filed: Aug. 16, 1971
[21] Appl. No.: 172,022

[52] U.S. Cl. ............................... 37/124, 37/126 AD
[51] Int. Cl. ................................................ E02f 5/00
[58] Field of Search ...................... 37/4, 8, 124–129

[56] References Cited

UNITED STATES PATENTS

| | | |
|---|---|---|
| 2,411,688 | 11/1946 | Keim et al. .................. 37/129 |
| 3,035,361 | 5/1962 | Peterson et al. ............. 37/129 |
| 1,293,536 | 2/1919 | Pfeil ............................ 37/129 |
| 2,562,193 | 7/1951 | Johnson ...................... 37/129 |

Primary Examiner—Robert E. Pulfrey
Assistant Examiner—Eugene H. Eickholt
Attorney—David S. Kane et al.

[57] ABSTRACT

A cover plate attachment for an elevating scraper which has a closed position for closing the open end of the scraper bowl when the scraper is in the raised or transport position and an open position allowing access to the open end of the scraper bowl when the scraper is in lowered position and the cutting edge of the bowl is in ground engagement; said cover plate being shiftable automatically and positively between said positions upon the raising or lowering of said scraper.

5 Claims, 4 Drawing Figures

PATENTED OCT 17 1972

3,698,109

INVENTOR
CHARLES DAVIS

INVENTOR
CHARLES DAVIS

COVER PLATE ATTACHMENT FOR ELEVATING SCRAPER

BACKGROUND OF THE INVENTION

Scrapers are specific types of earth moving equipment which are efficient for moving earth over relatively level terrain for relatively short distances. For longer distances or for large and changing grades, trucks are used.

Scrapers have the advantages of being self-loading and of being capable of discharging the earth in finally controlled layers. There are several types of scrapers in use, each having its own advantages and disadvantages. One popular scraper design consists generally of a crawler or rubber-tired tractor having attached thereto a container or bowl. The bowl has a bottom with a front earth cutting edge and upwardly projecting rear and side walls leaving the top and front open. The front end of the bowl is attached to a hydraulically driven elevating arm on the crawler. This is called an elevating scraper. The rear end of the bowl is supported above ground surface by rear ground wheels and the front end of the bowl can be pivoted about the rear ground wheels between a raised or transport position and a lowered or ground engaging position by the elevating arm.

In the lowered position the front cutting edge of the bowl bottom is in ground engagement and movement of the bowl by the crawler causes earth to move into the bowl. This movement of earth into the bowl is frequently aided by a chain-driven conveyor system.

In the raised or transport position earth is frequently spilled out of the front open end of the bowl. This is unsatisfactory from an engineering as well as an economical point of view. Suitable means for preventing this is required and such means must be reliable and positively and automatically actuated without the necessity of additional adjustments or operations in use of the equipment.

SUMMARY OF THE INVENTION

An elevating scraper of the type including a bowl, a bottom of the bowl, a front ground engaging edge of the bottom of the bowl, side walls and a rear wall projecting upwardly from the bottom to form the bowl with an open front end, ground wheels pivotally supporting the bowl above ground at its rear end and lever means supporting the front end of the bowl above the ground, a bowl front end raised position of the bowl, a bowl front end lowered position of the bowl with the ground engaging edge engaging the ground in the lowered position and means provided for raising and lowering the lever means to pivot the bowl about the ground wheels between the two positions and in combination therewith support plate means attached to the lever means, attachment arm means pivotally attached to the support plate means, first and second spaced sections of the attachment arm means, a cover plate pivotally attached to the first section, a stop projecting from the bowl, stop engaging means of the attachment arm means at the second section, an open position of the cover plate in the lowered position of the bowl with the stop engaging means abutting the stop and the cover plate spaced from the bowl and a closed position of the cover plate in the raised position of the bowl with the cover plate abutting the bottom of the bowl and closing the open front end.

DESCRIPTION OF THE PREFERRED EMBODIMENT

Figure 1:
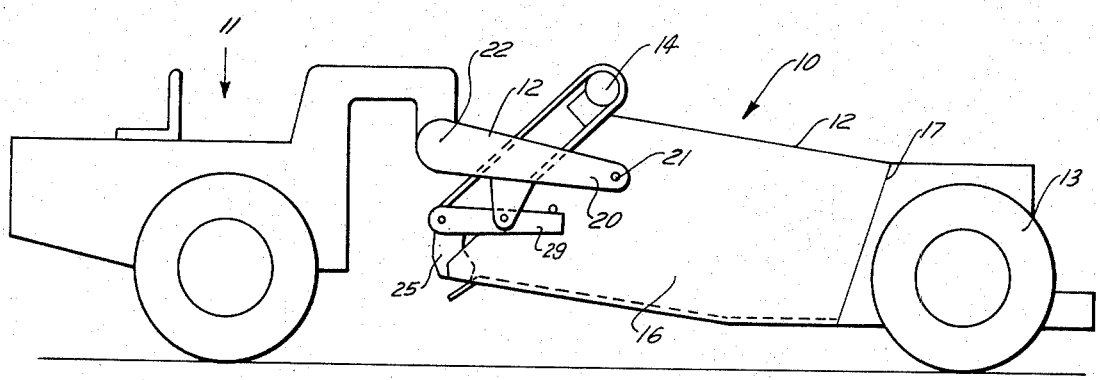
FIG. 1 is a side elevation of a crawler connected to an elevating scraper provided with a cover plate attachment which is the subject of this invention.

An elevating scraper generally designated by the numeral 10 is shown in FIG. 1 connected to crawler 11 in the usual manner by arms pivotally attached thereto. The scraper consists of bowl 12, ground wheels 13 (only one shown) pivotally supporting the bowl above ground surface at its rear end, and chain-driven conveyor 14 which aids the movement of earth into the bowl in the lowered position thereof. The scraper bowl is formed with an open front end by bottom 15 and identical side walls 16 (only one shown) and rear wall 17 which project upwardly from bottom 15. Ground engaging edge 18 projects downwardly at the bowl front from the inside floor 19 of the scraper bowl.

Figure 2:
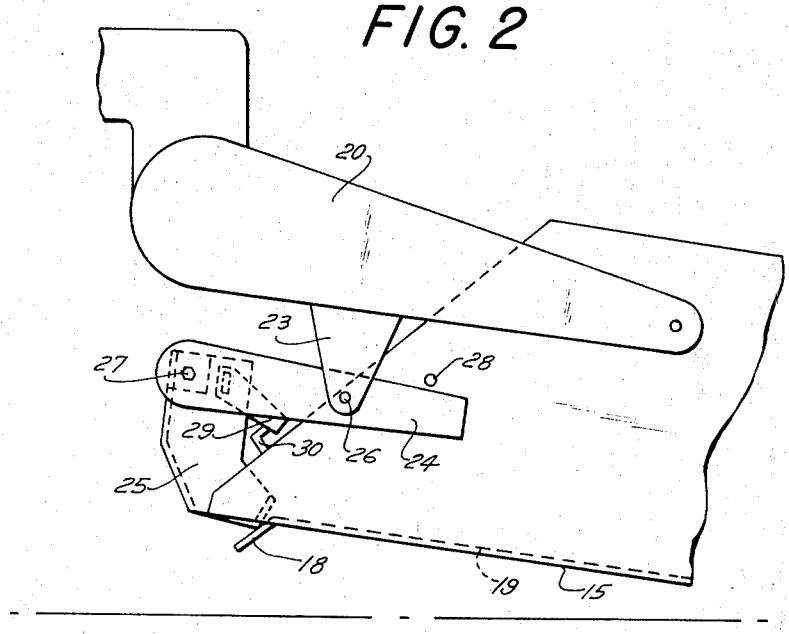
FIG. 2 is a segmentary side view of the bowl, cover plate and attaching mechanism with the bowl in the raised position and the cover plate in the closed position.

In the FIGS. one of the arms connecting the bowl to the crawler is shown and designated by the numeral 20. It is pivotally attached to one side of the bowl at pivotal connection 21. An identical arm (not shown) is likewise pivotally attached to the bowl at the remaining side wall thereof. The arms 20 support the front end of the bowl above ground surface and are hydraulically driven to rotate about an axis 22 in order to raise or lower the bowl by rotating it about wheels 13. In the FIGS. the bowl is shown in raised position in FIGS. 1 and 2 and in lowered position in FIG. 3.

Figure 3:
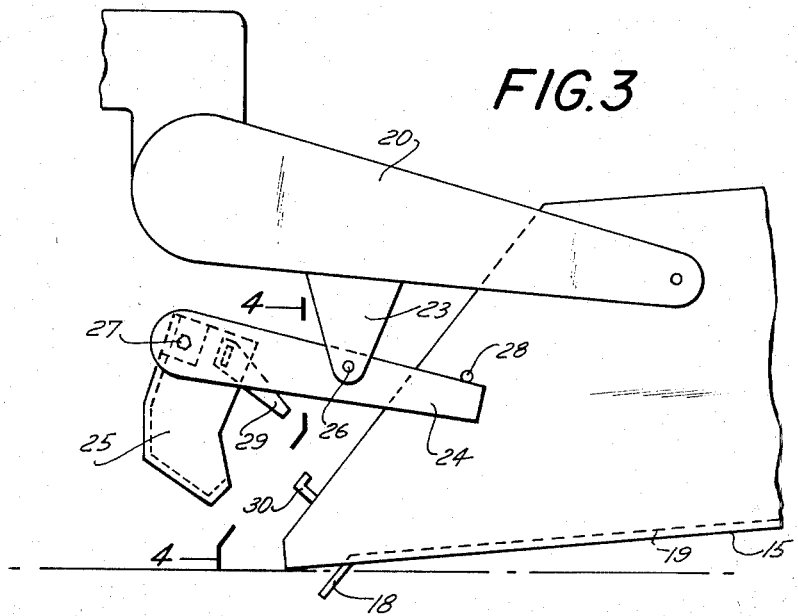
FIG. 3 is a segmentary view similar to FIG. 2 with the bowl in the lowered position and the cover plate in the open position.

In the lowered position the front cutting edge 18 is in ground engagement and movement of the bowl by the crawler in a direction such as to the left in FIG. 3 causes earth to move into the bowl. This movement of earth into the bowl is aided by the chain-driven conveyor system 14. In the raised or transport position of FIG. 1 and FIG. 2 in the absence of the cover plate which is the subject of this invention, earth is frequently spilled out of the front open end of the bowl.

The cover plate attachment which is the subject of this invention includes identical support plates 23 attached to hydraulically driven arms 20, identical attachment arms 24 pivotally attached to support plates 23 and cover plate 25 which is pivotally attached at either end to attachment arms 24. One pivotal connection of attachment arm 24 and support plate 23 is shown in the FIGS. and designated by the numeral 26 while one pivotal connection of the cover plate 25 and attachment arm 24 is shown and designated by the numeral 27. The cover plate is attached to each of the attachment arms at one end thereof and the remaining end of each attachment arm is provided with a stop engaging surface 24a. Stops 28 respectively project from the side walls of the bowl and in the open position of the cover plate in the lowered position of the bowl shown in FIG. 3, the stop engaging surfaces abut respective stops 28 and the cover plate is spaced from the bowl. In the closed position of the cover plate shown in FIG. 2 which is the raised position of the bowl, the cover plate abuts the bottom of the bowl closing the open front end thereof.

In operation and after the bowl has been substantially filled and is in the position shown in FIG. 3, it is raised by arm 20 in the usual manner. The stop 28 is raised at a rate faster than the pivot point 26 is raised so that the arm 24 will rotate clockwise about pivot 26 causing cover plate 25 to come around and close the front of the bowl in the raised position shown in FIG. 2. When the bowl is lowered in the transition from the position shown in FIG. 2 to the position shown in FIG. 3, stop 28 abuts the upper edge of arm 24 and the arm is rotated counterclockwise about pivot 26 removing plate 25 from engagement with the bucket.

In addition, the scraper attachment has means for "positively" closing bowl 16 with cover plate 25.

Figure 4:
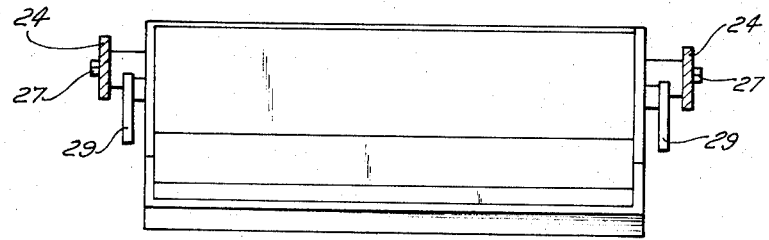
FIG. 4 is a partially sectional view taken along the line 4—4 in the direction of the arrows in FIG. 3.

The cover plate 25 is in the form of a scoop having sides and a rear wall. An arm 29 is rigidly attached to each side of the bucket as shown in the FIGS. Two arms 29 are shown in FIG. 4. Arms 29 project from the cover plate toward the bowl and a projecting member 30 is provided at each side wall of the bowl and projects in the direction of the cover plate. As the bucket is raised and arm 24 is rotated clockwise, the end of the arm 24 and the cover plate 25 are being rotated in the direction of the scraper. Each of the projecting members 30 strike a respective arm 29 giving a positive impetus to plate 25 in the direction to create a positive closure. Upon opening, projecting member 30 is removed from adjacency to arm 29 and stop 28 striking the end of attachment arm 24 gives a positive impetus to opening.

Thus, it is seen that there is provided a cover plate attachment for the scraper which in the closed position thereof closes the open end of the scraper bowl when the scraper is in the raised or transport position while allowing access to the open end of the scraper bowl when the scraper is in the lowered position and the cutting edge of the bowl is in ground engagement. The cover plate is shiftable automatically and positively between the two positions upon the raising or lowering of the scraper.

I claim:

1. In an elevating scraper of the type including a bowl, a bottom of said bowl, a front ground engaging edge of said bottom, side walls of said bowl, a rear wall of said bowl, said side walls and said rear wall projecting upwardly from said bottom and forming said bowl with an open front end, ground wheels pivotally supporting said bowl above ground at its rear end, lever means supporting the front end of said bowl above ground surface, a bowl front end raised position of said bowl, a bowl front end lowered position of said bowl, said ground engaging edge engaging the ground in said lowered position, and means for raising and lowering said lever means to pivot said bowl about said ground wheels between said raised and said lowered positions, that improvement including in combination therewith support plate means attached to said lever means, attachment arm means pivotally attached to said support plate means, first and second spaced sections of said attachment arm means, a cover plate pivotally attached to said first section, a stop projecting from said bowl, stop engaging means of said attachment arm means at said second section, an open position of said cover plate in the lowered position of said bowl with said stop engaging means abutting said stop and said cover plate spaced from said bowl and a closed position of said cover plate in the raised position of said bowl with said cover plate abutting the bottom of said bowl and closing said open front end.

2. In an elevating scraper of the type including a bowl, a bottom of said bowl, a front ground engaging edge of said bottom, first and second side walls of said bowl, a rear wall of said bowl, said side walls and said rear wall projecting upwardly from said bottom and forming said bowl with an open front end, ground wheels pivotally supporting said bowl above ground at its rear end, first and second levers pivotally attached respectively to said first and second side walls supporting the front end of said bowl above ground surface, a bowl front end raised position of said bowl, a bowl front end lowered position of said bowl, said ground engaging edge engaging the ground in said lowered position, and means for raising and lowering said levers to pivot said bowl about said ground wheels between said raised and said lowered positions, that improvement including in combination therewith first and second support plates respectively attached to said first and second levers, first and second attachment arm means pivotally attached respectively to said first and second support plates, first and second spaced sections of said first attachment arm means, third and fourth spaced sections of said second attachment arm means, a cover plate pivotally attached at respective ends to said first and third sections, first and second stops respectively projecting from said first and second side walls, first and second stop engaging surfaces of said second and fourth sections respectively, an open position of said cover plate in the lowered position of said bowl with said stop engaging surfaces abutting said stops and said cover plate spaced from said bowl and a closed position of said cover plate in the raised position of said bowl with said cover plate abutting the bottom of said bowl and closing said open front end.

3. An elevating scraper in accordance with claim 1 in which means are provided for positively closing said open front end by abutment of said cover plate and said bowl bottom said means including first and second projecting means respectively projecting from said cover plate and said bowl toward each other whereby upon closure said projecting means abut imparting pivotal motion to said cover plate in the direction of closure.

4. An elevating scraper in accordance with claim 1 in which means are provided for positively opening said front end by discontinuance of abutment of said cover plate and said bowl bottom said means including said stop and said stop engaging means whereby upon opening said stop strikes said stop engaging means giving a pivotal impetus to said cover plate in the direction of opening.

5. An elevating scraper in accordance with claim 2 in which first and second means are provided for respectively positively closing and positively opening said open front end said first means including first and second projecting means respectively projecting from said cover plate and said bowl toward each other whereby upon closure said projecting means abut imparting pivotal motion to said cover plate in the direction of closure and said second means including said first and second stops and said first and second stop engaging surfaces whereby upon opening said first stop strikes said first stop engaging surface and said second stop strikes said second stop engaging surface giving a pivotal impetus to said cover plate in the direction of opening.

* * * * *